Oct. 5, 1965    E. A. SHELTON    3,210,068
MAGNETIC SPACING TOOL
Filed April 30, 1962

INVENTOR.
EDGAR A. SHELTON
BY
ATTORNEY

United States Patent Office 3,210,068
Patented Oct. 5, 1965

3,210,068
MAGNETIC SPACING TOOL
Edgar A. Shelton, Ponca City, Okla., assignor to Continental Oil Company, Ponca City, Okla., a corporation of Delaware
Filed Apr. 30, 1962, Ser. No. 190,942
5 Claims. (Cl. 269—8)

The present invention relates to a spacing tool and more particularly, but not by way of limitation, relates to a spacing tool for establishing a uniform gap of a desired width between two objects to be welded together.

As is well known in the welding art, whenever two objects of any appreciable thickness are to be welded together along adjacent edges, it is essential that the objects be spaced a short distance apart in order to provide a weld gap which will permit molten weld material to penetrate to the opposite sides of the objects. This is particularly true in instances where the ends of two joints of pipe are to be butt-welded together, because in such a case it is not possible to apply a separate weld bead to the interior walls of the pipe. If the welding material or weld bead is not of a uniform thickness corresponding to the thickness of the pipe, the resulting weld will be non-homogeneous and will be appreciably weaker than the pipe itself. It is customary to alleviate this problem to a certain extent by beveling the ends of the joints of pipe so as to provide a V-shaped weld groove. However, even then it is preferable, and frequently necessary, to space the ends of the pipe apart a fraction of an inch in order to assure that the weld material will penetrate to the interior surface of the pipe. Of course, the same problem exists when welding any two objects together, but is particularly prevalent when welding any type of tubular fittings such as elbows, T's, and the like to pipe or to a flat plate, as the case may be.

Therefore it is an important object of the present invention to provide a tool for spacing two objects which are to be welded together a desired distance apart in order to provide the necessary weld gap will such time as the two objects can be tacked together.

Another very important object of the present invention is to provide a spacing tool of the type described which will be securely held in place without assistance from a welder.

Still another object of the present invention is to provide a spacing tool of the type described which may very easily be attached in operative position on a joint of pipe or the like and which may be easily disconnected.

Yet another object of the invention is to provide a spacing tool of the type described which may be utilized to both space and align two paramagnetic objects, such as two joints of pipe, which are to be welded together.

Another object of the present invention is to provide a spacing tool of the type described which may easily and positively be attached in operative positive on a joint of pipe or the like having substantially any radius of curvature, or to a flat plate as may be desired.

A further object of the present invention is to provide a spacing tool of the type described which may be economically manufactured and which may easily and quickly be adapted to provide a weld gap of substantially any desired width.

A spacing tool constructed in accordance with the present invention generally comprises a spacer member having a thickness corresponding to the desired spacing between the two objects to be welded together and attaching means connected to the spacer member for attaching the tool to one of the objects with the spacer member disposed between the two objects.

More specific novel features of construction together with additional objects and advantages of the present invention will be evident from the following detailed description and drawings, wherein.

Figure 2:
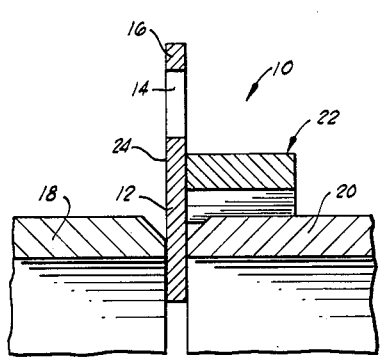
FIGURE 2 is a longitudinal sectional view taken substantially on line 2—2 of FIGURE 1.
Figure 1:
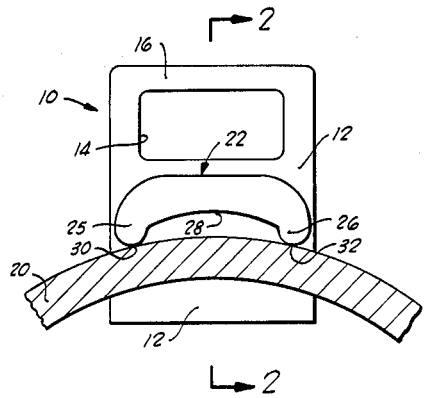
FIGURE 1 is an end view of a spacing tool constructed in accordance with the present invention, the spacing tool being shown in operative position on a joint of pipe, the pipe being shown in cross section.
Figure 5:
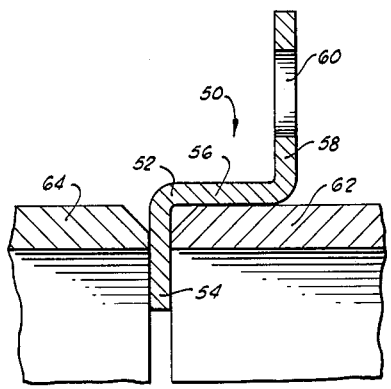
FIGURE 5 is a longitudinal sectional view taken substantially on line 5—5 of FIGURE 4.

Referring now to the drawings, and in particular to FIGURE 1 a spacing tool constructed in accordance with the present invention is indicated generally by the reference numeral 10. Spacing tool 10 is comprised of an elongated, spacing member or plate 12 having a cutout 14 which forms a handle portion 16. Spacer plate 12 may have any desired configuration when viewed as in FIGURE 1, but has a thickness, as shown in FIGURE 2, equal to the desired spacing to be established between the adjacent portions of paramagnetic workpieces, such as two joints of pipe 18 and 20.

Means, such as a permanent magnet, indicated generally by the reference numeral 22 is provided for holding the spacer plate 12 on a workpiece. It is to be understood that while, as a practical expedient, a permanent magnet will most often be used, this invention is not limited to such structure, under some conditions an electromagnet may be found quite satisfactory. Magnet 22 preferably has a substantially constant cross section having an outline substantially as shown in FIGURE 1. Thus it will be noted that magnet 22 has a somewhat U-shaped or horseshoe-shaped cross section forming elongated projections 25 and 26 with a recess or channel 28 therebetween. The ends of the projections 25 and 26 which contact pipe 20 are preferably rounded substantially as shown in FIGURE 1 to form a pair of parallel, elongated, somewhat cylindrically rounded contact surfaces 30 and 32. Projections 25 and 26 preferably constitute the north and south poles of magnet 22. It will be noted that magnet 22 is preferably connected to what may be considered a midpoint of spacer plate 12. Also, contact surfaces 30 and 32 preferably extend to substantially right angles from the plate.

The means for securing spacer plate 12 to magnet 22 may take various forms. For instance, when plate 12 comprises paramagnetic material the magnetic attraction between the magnet and the plate may be adequate. Such structure would have the advantage of allowing a quick change to a spacer plate having a greater or less thickness when a different spacing between the workpieces is indicated. Mechanical locks such as a dovetail groove, as well as chemical adhesives may also be used for the stated purpose when indicated by expediency, economics or materials at hand. In a preferred embodiment, plate 12 and magnet 22 are secured together by a pair of screws (not shown) which are countersunk to provide a smooth face 24.

When it is desired to employ tool 10 to establish a peripheral weld gap of a desired width between the abutting ends of two joints of pipe 18 and 20, for example, at least one of the spacing tools is attached to one of the joints of pipe by magnet 22. Rounded contact surfaces 30 and 32 of elongated projections 25 and 26 will extend parallel to the axis of the pipe and will contact the curved outer surface of pipe 20 for the entire length of magnet 22 regardless of the diameter of the pipe. Since one of the projections 25 is the north pole of the permanent magnet and the other of the projections 26 is the south pole, definite lines of magnetic flux will be established in a closed path through the body of magnet 22, projections 25 and 26 and the pipe to establish maximum attaching force for the entire length of the magnet. Further, it will be noted that the curved surfaces of projections 25 and 26 will uniformly seat on a pipe having virtually any radius of curvature, or on a flat surface.

When racks or other suitable means are available for axially aligning the two joints of pipe 18 or 20, for example, only one spacing tool 10 is required to establish a uniform weld gap. The single spacing tool 10 may be positioned on one of the joints, and the ends of the two joints of pipe may then merely be abutted against spacer plate 12 of spacing tool 10, and, provided that the ends of the joints of pipe are square, a uniform weld gap will be established around the circumference of the joints of pipe having a width corresponding to the thickness of spacer plate 12. The two joints of pipe 18 and 20 may then easily be tacked together by welding two or more small spots so that spacing tool 10 can be removed. In this connection, it will be noted that spacing tool 10 can easily be removed merely by gripping handle portion 16, cutout 14 providing easy access for one or more fingers, as desired. It will further be noted that when pulling on handle 16, the force of the magnetic attraction of magnet 22 would normally tend to exert a rotating torque on the tool. However, since the lower end of spacer plate 12 is retained between the ends of the two joints of pipe 18 and 20, this rotating torque will be effectively counterbalanced and spacing tool 10 may easily be withdrawn from between the two joints of pipe merely by overcoming the force of attraction of the magnet.

Figure 3:
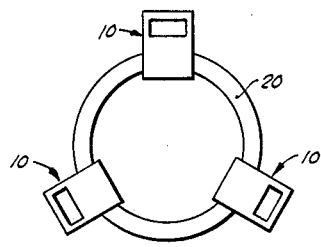
FIGURE 3 is an end view of a joint of pipe showing a plurality of the spacing tools constructed in accordance with the present invention in operation position thereon.

In the event means are not available for accurately aligning the two objects, such as the joints of pipe, which are to be welded together, two or more of spacing tools 10 may be placed at spaced intervals around the periphery of the joint of pipe 20, substantially as shown in FIGURE 3. Then when the other joint of pipe 18 is abutted against the several spacer plates 12 of spacing tools 10, the two joints of pipe 18 and 20 will automatically be axially aligned with a uniform weld gap of the desired width around the periphery of the pipe. The two objects may then be tacked together by welding at three spots between adjacent spacing tools 10 and the spacing tools removed to permit completion of the weld. Of course, it will also be evident to those skilled in the art that spacing tool 10 may be utilized to space two flat sheets and most types of pipe weld fittings such as T, elbows, etc. Also, since a flat face 24 is provided the device may be used to butt-weld a pipe, fittings, or plate to the center of a plate.

It will be appreciated that spacing tool 10 may be very economically manufactured. Spacer plates 12 may be stamped or otherwise cut from a plate having the desired thickness. Cutout 14 and any other structure such as apertures for receiving attaching screws may then be formed in any suitable manner. Magnet 22 may readily be cast in the desired form from any suitable magnetizable material such as iron, and may be permanently magnetized so as to establish the north and south poles in projections 25 and 26. It will also be appreciated that a complete set of spacing tools for establishing weld gaps of any desired width may be provided merely by including from one to three magnets 22 and an equal number of spacer plates 12 for each desired weld gap width. Then each time that it is desired to establish a weld gap of a different width, the undesired plate may be removed and the magnet attached to the spacer plate of the desired thickness.

Figure 4:
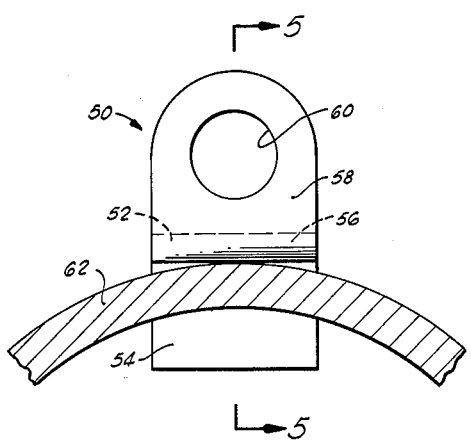
FIGURE 4 is an end view similar to FIGURE 1, but showing another form of spacing tool constructed in accordance with the present invention.

Referring now to FIGURE 4, another spacing tool constructed in accordance with the present invention is indicated generally by the reference numeral 50. Spacing tool 50 is fabricated from a metallic strap 52 bent to form a spacer plate portion 54, a magnet portion 56 which is disposed at right angles to spacer plate portion 54, and a handle portion 58 which is disposed at substantially a right angle to magnet portion 56. Handle portion 58 may be provided with an aperture 60 for assisting in removing spacing tool 50 from operative position between two objects to be welded. At least magnet portion 56, and if expedient, the entire metallic strap 52, is magnetized by any suitable method to provide a permanent magnet. The spacing tool 50 is illustrated in operative position between the ends of two joints of pipe 62 and 64.

Spacing tool 50 is utilized in substantially the same manner as spacing tool 10 as will be evident to those skilled in the art. Accordingly, the use of spacing tool 10 will not be described in detail. However, it will be appreciated that spacing tool 50 may be very economically manufactured merely by stamping or otherwise cutting strap 52 in the desired shape and bending the ends at 90 degrees to form spacer plate portion 54 and handle portion 58.

From the above detailed description, it will be evident that a highly novel and useful spacing tool has been described. However, it is to be understood that various changes, substitutions and alterations can be made in the particular embodiments described without departing from the spirit and scope of the invention as defined by the appended claims.

What is claimed is:

1. A tool for spacing paramagnetic workpieces having various diameters a desired distance apart which comprises:
    a spacer plate having a thickness corresponding to the desired spacing between the workpieces of pipe, and
    a magnet for attaching the tool to one of the workpieces, secured to the spacer member at a position thereon spaced from one edge thereof a substantial distance to allow insertion of the edge and at least a portion of the spacer member between the workpieces,
    the magnet being characterized by two elongated, parallel contact surfaces for engaging a workpiece, the contact surfaces being disposed substantially perpendicular to the spacer plate.

2. A tool for spacing two paramagnetic workpieces a desired distance apart which comprises:
    an elongated spacer plate having a thickness corresponding to the desired spacing between the two workpieces and having a handle formed on one end thereof, and
    a permanent magnet for attaching the tool to a workpiece connected to a midpoint of the spacer plate and spaced from an edge of said spacer plate opposite said handle for positioning said last named edge and at least a portion of the spacer plate between two workpieces,
    the magnet being characterized by two elongated, parallel contact surfaces for engaging the workpiece, the contact surfaces being disposed substantially perpendicular to the spacer plate, and placed a substantial distance from said last named edge.

3. A tool for spacing two paramagnetic workpieces a desired distance apart which comprises a metallic strap bent to form
    a spacer plate portion having a thickness corresponding to said desired spacing distance,
    a magnet portion extending at a substantially a right angle from one end of the spacer plate portion, and
    a handle portion, having an aperture therein, extending at substantially a right angle from the magnet portion, in a direction away from said spacer plate portion.

4. A tool for spacing two paramganetic workpieces a desired distance apart which comprises:
  a spacer member having a thickness corresponding to the desired spacing between the workpieces,
  a magnet for attaching the tool to one of the workpieces connected to the spacer member at one end of said spacer member and normal thereto whereby a portion of said spacer member extends a substantial distance from said magnet, and
  a handle connected to the magnet for removing the tool from a joint of pipe to which it may be attached.

5. A tool for spacing two paramagnetic workpieces a desired distance apart which comprises:
  (1) A permanent magnet having a generally U-shaped cross section and a longitudinal axis normal to said U-shaped cross section, said magnet being magnetized such that one arm of the U is a magnetic north pole and the other arm of the U is a magnetic south pole,
  (2) A flat plate secured at the mid-section thereof to said magnet along a plane normal to the longitudinal axis of said magnet, said plate having:
    (a) a first portion extending substantially beyond the curved portion of the U-shaped magnet and formed into a handle, and
    (b) a second portion extending substantially beyond the arms of said U-shaped magnet, said second portion being of a thickness corresponding to the desired spacing between said two paramagnetic workpieces.

References Cited by the Examiner

UNITED STATES PATENTS

| | | | |
|---|---|---|---|
| 2,396,452 | 3/46 | Widmark et al. | 33—180 |
| 2,584,072 | 1/52 | White | 113—111 |
| 2,585,343 | 2/52 | Newlon | 113—102 |
| 2,664,638 | 1/54 | Storey | 33—168 |
| 2,813,710 | 11/57 | Angle. | |
| 3,033,144 | 5/62 | Schmidt | 113—99 |
| 3,045,620 | 7/62 | Buck | 113—99 |
| 3,076,261 | 2/63 | Christensen | 285—22 |

CHARLES W. LANHAM, *Primary Examiner.*

JOHN F. CAMPBELL, *Examiner.*